(12) United States Patent
Storch et al.

(10) Patent No.: US 8,090,629 B2
(45) Date of Patent: Jan. 3, 2012

(54) CO-BRANDED INTERNET SERVICE PROVIDER AND RETAILER INTERNET SERVICE SITE WITH RETAILER-OFFERED INCENTIVES FOR MEMBER USE

(75) Inventors: Gerald Storch, Wayzata, MN (US); Bob Giampietro, Edina, MN (US)

(73) Assignee: Target Brands, Inc., Minneapolis, MN (US)

( * ) Notice: Subject to any disclaimer, the term of this patent is extended or adjusted under 35 U.S.C. 154(b) by 780 days.

(21) Appl. No.: 11/952,429

(22) Filed: Dec. 7, 2007

(65) Prior Publication Data

US 2008/0215431 A1    Sep. 4, 2008

Related U.S. Application Data

(63) Continuation of application No. 09/865,893, filed on May 25, 2001, now Pat. No. 7,308,420.

(60) Provisional application No. 60/206,917, filed on May 25, 2000.

(51) Int. Cl.
*G06Q 30/00* (2006.01)
(52) U.S. Cl. ...................................... 705/27.1
(58) Field of Classification Search .............. 705/26.1, 705/26.2, 26.25, 26.3, 26.35, 26.4, 26.41–26.44, 705/26.5, 26.61–26.64, 26.7, 26.8, 26.81, 705/26.82, 26.9, 27.1, 27.2
See application file for complete search history.

(56) References Cited

U.S. PATENT DOCUMENTS

| | | |
|---|---|---|
| 5,637,847 A | 6/1997 | Watanabe |
| 5,715,314 A | 2/1998 | Payne et al. |
| 5,774,870 A | 6/1998 | Storey |
| 5,794,210 A | 8/1998 | Goldhaber et al. |
| 5,956,483 A | 9/1999 | Grate et al. |
| 5,956,709 A | 9/1999 | Xue |
| 5,970,469 A | 10/1999 | Scroggie et al. |
| 6,014,634 A | 1/2000 | Scroggie et al. |
| 6,026,376 A | 2/2000 | Kenney |
| 6,029,141 A | 2/2000 | Bezos et al. |
| 6,032,130 A | 2/2000 | Alloul et al. |
| 6,052,710 A | 4/2000 | Saliba et al. |
| 6,141,666 A | 10/2000 | Tobin |
| 6,646,659 B1 * | 11/2003 | Brown et al. ................. 715/811 |
| 7,308,420 B1 | 12/2007 | Storch et al. |

OTHER PUBLICATIONS

"AOL and HP Ink Co-Brandiung Deal", internetnews.com, Aug. 31, 1998. Retrieved from http://www.internetnews.com/bus-news/article.php/22341/AOL-and-HP-INK-Co-Branding-Deal.htm.*

Worick, Lovina "Co-Branding Online", Mortgage Originator, Nov. 2003.*

(Continued)

*Primary Examiner* — Naeem Haq
(74) *Attorney, Agent, or Firm* — Griffiths & Seaton PLLC

(57) ABSTRACT

A system and method for a retailer to sell merchandise over the Internet in affiliation with an Internet service provider. The co-branded Internet site is accessible through the Internet service site of the Internet service provider. The co-branded Internet site includes designations of both the retailer and the Internet service provider. The co-branded Internet site including one or more links to the Internet shopping site of the retailer. Client software for accessing the co-branded Internet site is distributed at retailer locations. Members of the co-branded Internet site are provided with incentives to access and shop on the Internet shopping site of the retailer through the co-branded Internet site.

17 Claims, 7 Drawing Sheets

OTHER PUBLICATIONS

"NetZero and LookSmart Team Up to Create Co-Branded Site for NetZero Subscribers", May 4, 1999. Retrieved from http://files.shareholder.com/downloads/LOOK/0x0x109211/08f8651f-1d8e-4d5d-b084-835a69e6ff8a/LOOK_News_1999_5_4_News_Releases.pdf.* www.officedepot.com, archived Nov. 17, 1999, found with archive.com, 2 pp.

www.staples.com, archived on Feb. 29, 2000, found with www.archive.com, 2 pp.

"American Interactive Media and Shopping.com Announce Strategic Marketing Agreement," Jan. 27, 1999, PR Newswire, New York, 2 pp.

Wilcox, "IBM to sell Aptiva direct," Oct. 18, 1999, www.news.com, 3 pp.

Kanellos, "Snafu prompts Microsoft to suspend some PC rebates," Jan. 7, 2000, www.news.com, 2 pp.

Kanellos, "CompuServe faces end of rebate boost," Dec. 16, 1999, www.news.com, 2 pp.

Junnarkar, "AOL, Wal-Mart next to team on Net service," www.news.com, published Dec. 16, 1999, by CNET news.com.

Crowley, "CompUSA Announces 'Click and Brick' Shopping Enhancements," PR Newswire New York, Dec. 21, 1999, 2 pp.

Yaqub, "Keep an Eye Out Avoid Being Strung Along by Finding Out Just How 'Free' That PC is," Chicago Tribune, Chicago, Illinois, Apr. 6, 2000, 3 pp.

"Shopping.com Announces the Grand Opening of the Internet's First Full Service Retail Destination Hub Site," Nov. 24, 1998, PR Newswire, New York, 2 pp.

* cited by examiner

CO-BRANDED INTERNET SERVICE PROVIDER AND RETAILER INTERNET SERVICE SITE WITH RETAILER-OFFERED INCENTIVES FOR MEMBER USE

CROSS-REFERENCE TO RELATED APPLICATION

This application is a continuation of U.S. patent application Ser. No. 09/865,893, filed May 25, 2001, and now issued as U.S. Pat. No. 7,308,420, which claims the benefit of U.S. Provisional Application No. 60/206,917, filed May 25, 2000.

FIELD OF THE INVENTION

The present invention relates generally to on-line (e.g., Internet) shopping. In particular, the present invention is a method and associated Internet service site for an on-line retailer to provide shopping services in affiliation with an Internet service provider.

BACKGROUND OF THE INVENTION

On-line (e.g., Internet) advertising, shopping and brand promotion continues to grow in popularity. Retailers and Internet service providers have recently joined forces to promote and expand their existing businesses, to promote and extend their brands, to develop and promote new synergistic strategies and businesses, and to expand into new markets and channels.

BRIEF SUMMARY OF THE INVENTION

The present invention relates to a method and system by which an Internet Service Provider ("ISP") and retailer, such as a service provider, grocery store, mass merchandiser or super store ("Retailer") provide a co-branded, subscriber-based Internet service site through which the subscribers can access the retailer's Internet shopping site and incentives for members to shop at the retailers web site. The present co-branded Internet site is the ISP's premium site or a customized version thereof that is accessed through a special addition requesting program or "client". The Internet service provider will increase subscribers by leveraging retailer's customer relationships. Retailer will build brand awareness, drive traffic to retailer's stores and to retailer's web site.

The present method is directed to a retailer of the type having an Internet shopping site to sell merchandise over the Internet affiliated with an Internet service provider of the type having an Internet service site with a graphical user interface. The method includes providing members access to a co-branded Internet site including the graphical user interface of the Internet service provider and one or more links to the Internet shopping site of the retailer. The members of the co-branded Internet site are provided with incentives to access and shop on the Internet shopping site of the retailer through the co-branded Internet site.

In one embodiment, the step of providing member incentives includes providing the members with a discount on merchandise purchased on the Internet shopping site accessed through the co-branded Internet site. In another embodiment, the step of providing member incentives comprises providing members with access to advertising circular content for the Internet shopping site through the co-branded Internet site before corresponding printed advertising circulars are distributed. In yet another embodiment, the step of providing members incentives comprises providing members with notice of store-based clearances, promotional event and/or special events on the Internet shopping through the co-branded Internet site before publishing notices for such special events non-members. In another embodiment, the step of providing member incentives includes providing the members with a discount on subscription fees for access to the co-branded Internet site based upon a quantity of merchandise purchased from the retailer.

DETAILED DESCRIPTION OF THE INVENTION

Figure 1:
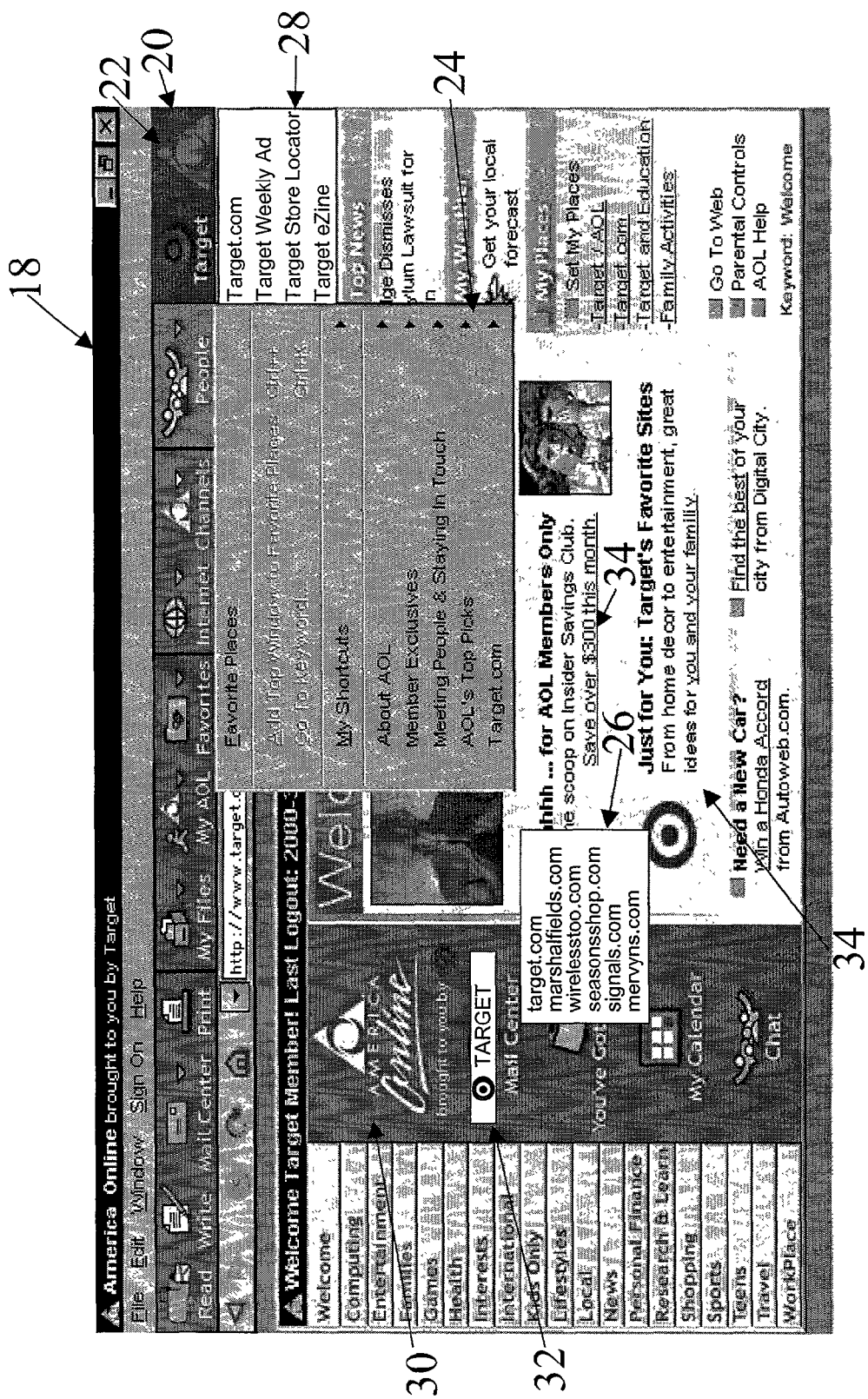
FIG. 1 is an illustration of an example of a co-branded home page for the co-branded Internet site in accordance with the present invention.

The present invention is based generally upon a membership and/or loyalty program offered jointly by the ISP and a retailer. In particular, the invention is a method and system by which the ISP and retailer provide a co-branded, subscriber-based Internet service site through which the subscribers can access the retailer's Internet shopping site. A variety of financial and/or other incentives are provided to the subscribers to encourage them to access the retailer's shopping site through the co-branded Internet services and to become subscribers to the ISP's premium Internet site.

The following terms and acronyms are used throughout the detailed description:

"Client-server" refers to a model of interaction in a distributed system in which a program at one site sends a request to a program at another site and waits for a response. The requesting software program is called the "client," and the program that responds to the request is called the "server." In the context of the World Wide Web (discussed below), the client is a "Web browser" (or simply "browser") which runs on a computer of a user; the program which responds to browser requests by serving Web pages is commonly referred to as a "Web server."

"Co-branded Internet site" refers to an Internet or Web site that is the ISP's premium site or a customized version thereof that is accessed through a special addition requesting software program or "client".

"Hyperlink" refers to a navigational link from one document to another, or from one portion (or component) of a document to another. Typically, a hyperlink is displayed as a highlighted word or phrase that can be selected by clicking on it using a mouse to jump to the associated document or documented portion.

"Internet" refers to a collection of interconnected (public and/or private) networks that are linked together by a set of standard protocols (such as TCP/IP and HTTP) to form a global, distributed network. (While this term is intended to refer to what is now commonly known as the Internet, it is also intended to encompass variations which may be made in the future, including changes and additions to existing standard protocols.)

"ISP" or "Internet Service Provider" refers to a company that provides individuals and other companies access to the Internet and other related services such as Web site building and virtual hosting. An ISP has the equipment and the telecommunication line required to have an access point to the Internet for the geographic area served.

"ISP's Premium Site" refers to an Internet or Web site (such as for example America Online or CompuServe) that is available to subscribers of the ISP using the ISP's conventional "client" software.

Members" refers to subscribers of the co-branded Internet site.

"Merchandise" refers to goods and/or services offered for resale by the retailer.

"World wide web" or "web" refer generally to both (i) a distributed collection of interlinked, user-viewable hypertext documents (commonly referred to as Web documents or Web pages) that are accessible via the Internet, and (ii) the client and server software components which provide user access to such documents using standardized Internet protocols. Currently, the primary standard protocol for allowing applications to locate and acquire Web documents is HTTP, and the Web pages are encoded using HTML. However, the terms "Web" and "World Wide Web" are intended to encompass future markup languages and transport protocols which may be used in place of (or in addition to) HTML and HTTP.

"Web site" or "web page" refers to a computer system that serves informational content over a network using the standard protocols of the World Wide Web. Typically, a web site corresponds to a particular Internet domain name, such as "target.com," and includes the content associated with a particular organization. As used herein, the term is generally intended to encompass both (i) the hardware/software server components that serve the informational content over the network, and (ii) the "back end" hardware/software components, including any non-standard or specialized components, that interact with the server components to perform services for web site users.

The present co-branded Internet site increases the number of subscribers to the ISP's services. The relationship of the ISP with the retailer differentiates the ISP's Internet services from other Internet service products offered by the ISP or by any other ISP. The ISP's Internet service are also promoted within the retailer's demographic group, using the retailer's stores, signage, advertisements, web sites, and so on to promote the co-branded Internet site. At the same time, "membership" in the co-branded Internet site builds loyalty and a psychological connection between the customer-members and the retailer.

The co-branded Internet site increases on-line, store-based, and catalog sales of the retailer's merchandise, products and services. Awareness of the retailer's brand(s) and programs designed to promote the retailer's brand(s), such as community activities, charitable giving, sponsorships, are also increased. The co-branded Internet site also extends the retailer's brands to new businesses, particularly on-line businesses.

In one embodiment, the co-branded Internet site has all of the benefits, features and functionality associated with the ISP's premium site. Alternatively, the co-branded Internet services can be a subset or customized version of the ISP's premium site.

Figure 6:
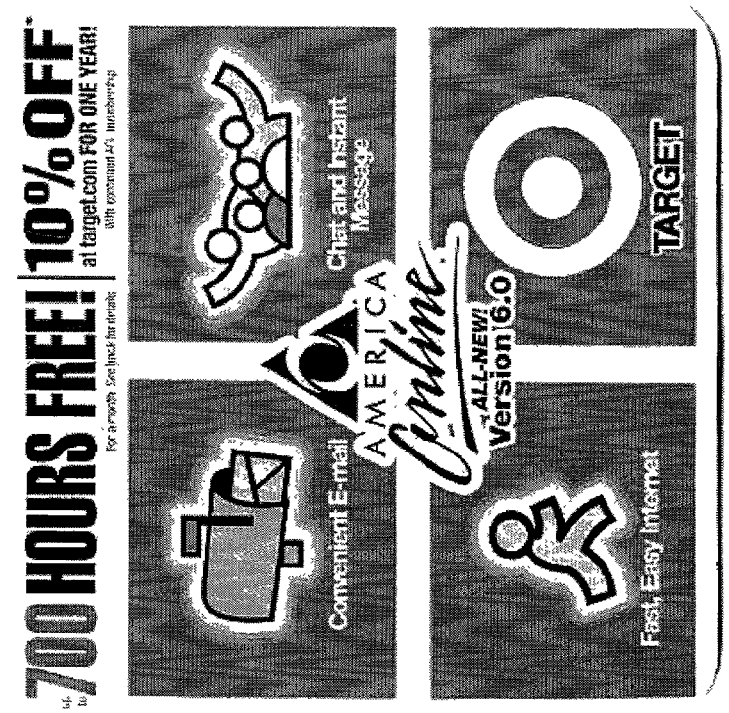
FIG. 6 is an example of a co-branded CD containing the "client" software and associated package for Internet service software in accordance with the present invention.
Figure 6:
Figure 7:
FIG. 7 is an example of an alternate co-branded CD containing the "client" software and associated package for Internet service software in accordance with the present invention.
Figure 7:

The co-branded Internet site and supporting materials can be co-branded with the names and logos of the ISP and the retailer. The co-branding elements can appear wherever branding elements traditionally appear. For example, the CD storage device on which the "client" software for accessing the co-branded Internet site is distributed and all related packaging can be co-branded (e.g., as shown in FIG. 6). All advertisements, marketing materials, and promotions for the co-branded Internet services can be co-branded. The ISP's premium site can also be co-branded.

In one embodiment, the co-branded Internet site, as viewed online by the member, is designed to have a unique "look and feel" that distinguishes it from any other service offered by the same ISP or any other ISP. The ISP's and the retailer's designations, such as tradenames, colors and logos, are typically displayed on every page, and the "look and feel" of the home page and recurring features of the site, e.g., the tool bar, can combine the look and feel of the ISP's premium site and the look and feel associated with the retailer and/or the retailer's web site. For example, if the ISP's premium site has a multicolored "rainbow" look and feel and the retailer's logo and trade dress are typically red and white, the home page and tool bar of the co-branded Internet site can be predominantly red and white, while retaining the icons and layout associated with the ISP's premium site.

A direct link to the retailer's web site(s) (preferably using the retailer's logo as an icon) can be prominently featured on the tool bar of the co-branded Internet site. The tool bar will frame every page on the co-branded Internet site. Thus, the customer will never be more than one click away from the retailer's web site(s). The retailer's web site(s) can be "cached" and framed by the co-branded Internet site so that members need not leave the co-branded Internet site. A direct link to the retailer's web site can be prominently featured on the drop-down menu behind the "Favorites" icon on the tool bar of the co-branded ISP site.

Members who subscribe to the co-branded Internet site will receive benefits not available to members of other Internet services. For example, members can automatically receive a discount (e.g., 10%) off of purchases made from the retailer's web site(s) when accessed through the co-branded Internet site. Various systems and methods for offering shopping incentives to customers through a computer network are disclosed in U.S. Pat. No. 6,014,634 (Scroggie et al.); U.S. Pat. No 5,970,469 (Scroggie et al.) and U.S. Pat. No 5,774,870 (Storey).

The discount can also be granted for a specified limited period of time following the initial subscription to the co-branded Internet site. Also, the rate of discount and the period of time over which the discount is available can vary on the basis of the member's commitment to the ISP. For example, the level of discount for retailer's products may be related to the duration that the member subscribes to the co-branded Internet site services.

The co-branded Internet site can also provide members with early on-line access to the retailer's weekly advertising circular, giving them advance notice of sales and other promotions. Members can receive advance notice of the retailer's store-based clearance activity and promotional events. Members can also receive enhanced subscriber support services including industry leading connectivity and access rates and dedicated telephone support. Some or all member benefits can be tied to the volume of purchases made by the member from the retailer's web site. In another embodiment, the member incentives includes providing the members with a discount on subscription fees for access to the co-branded Internet site based upon a quantity of merchandise purchased from the retailer.

The ISP and the retailer can jointly create a mini-web site within the ISP site (referred to as a "Retailer Channel"). In another embodiment, subscribers of ISP's premium site may be provided limited, temporary or full access to the co-branded Internet site.

The link to the retailer channel can be prominently placed as a permanent feature on the home page of the co-branded Internet site, as a channel bar, an icon or some other form of link. When the member clicks on the channel bar, the member will be linked to the web page of the retailer channel.

The retailer channel can provide content of interest to the retailer's demographic group, presented with the retailer's look and feel and in the retailer's voice. Some of the retailer channel content can be unique to and created specifically for the retailer channel. Much of the content can be content already located elsewhere on the ISP premium site or on the retailer's web site(s). This "borrowed" content can be wrapped on the retailer channel so that members who fit within the retailer's demographic will not have to browse the entire co-branded Internet site to find content of interest to them.

For example, if the ISP offers a news "channel," news stories of interest to the retailer's demographic group will be featured on appropriate pages of the retailer channel using hyperlink and framing technology. Content can be "pulled" from different sites to create content clusters. For example, a page covering child safety might include a link to a news article describing the results of safety tests on infant car seats (taken from the ISP's news channel), a link to instructions on properly installing an infant car seat located on the retailer's web site, and a link to the page on the retailer's on-line retail site on which infant car seats can be purchased. The retailer's bridal registry service can be "wrapped" on a channel page featuring articles of interest to couples planning their weddings. From the bridal registry pages, the member would be able to access the retailer's on-line store and purchase and send a wedding gift.

The retailer channel can also provide, promote and/or support services and products offered by the retailer, its affiliates and its business partners. For example, members will be able to apply for the retailer's proprietary credit card within the retailer channel. If the retailer operates a pharmacy as part of its store, members will be able to fill or renew prescriptions or e-mail a pharmacist using the retailer channel. If the retailer offers film development services within its stores, the retailer channel will have features that permit members to have their photographs delivered online or to have copies sent to multiple store locations for pick-up by relatives in different states.

The retailer channel can have segment zones (mini-sites within the channel) with content aimed at different segments, such as women, teens, children, cooks, gardeners, gamers, etc. Similarly the retailer channel can have seasonal zones (mini-sites within the channel) such as Halloween, back-to-school and holiday zones.

The splash or welcome page (the advertisement or other message that appears when a member first accesses the co-branded Internet site) can contain either a message from the retailer or a message about the features of the co-branded Internet site. Additionally, the co-branded Internet site can be structured so that the retailer's web site(s) can come up first in any relevant search performed using the ISP's search engines.

The ISP and the retailer can create special functionality and member aids, such as personalization tools, tools that simplify and allow for the greatest utility of the co-branded Internet site's features and functionality. For example, a co-branded CD ROM or other tool which provides an interactive "tour" or guide to the site would enhance the utility of many commonly used features such as instant messaging buddy list, parental controls, calendar, E-mail and chat rooms. The co-branded Internet site can be packaged with co-branded gifts and other merchandise. Different packages will be created for different segments (e.g., teens, gardeners, baseball fans) to add value to the consumer.

The retailer can have a significant advertising presence throughout the ISP's premium site, equivalent to "anchor store" status in a shopping mall. Membership to the co-branded Internet site can be advertised and "sold" on the retailer's web site(s) and/or the ISP's premium site. The co-branded Internet site can be prominently promoted throughout the retailer's physical stores, e.g., at check-out, in the electronics area, on "end caps," on signage, in the retailer's circular and other advertising media, on the retailer's web site(s) and so on.

The ISP and the retailer can jointly develop and execute a media campaign to promote the co-branded Internet site. Still other features that can be incorporated into the co-branded Internet site include: 1) parental controls preset to an agreed upon level, 2) the ability to accept the retailer's credit card for payments, including the ISP/retailer premium Internet service subscription fees, 3) the ability for current co-branded Internet site members to easily migrate to the ISP's premium Internet services without loosing customized or personalized features of the service, and/or 4) as hours of free subscription service as are offered by the premium ISP service package or any other premium co-branded product.

FIG. 1 is an illustration of an example of a co-branded Internet site "welcome" or home page 18 in accordance with the present invention. The tool bar 20 includes a retailer button link 22 to a drop down menu 24 of links 28 to other retailer-specific sites. In the example shown, the retailer button link 22 includes both the retailer's name and logo trademarks. The illustrated drop down menu 24 includes a sub-menu 28 with links to the retailer's shopping site (e.g., Target.com), periodic (e.g., weekly) advertising circular, store locator service and an on-line periodical. Also accessible from the home page 18 is another drop down menu 26 with links to shopping sites and catalogs affiliated with the retailer (e.g., MARSHALLFIELDS.COM, WIRELESSTOO.COM, SIGNALS.COM, MERVYNS.COM, etc.).

In the example shown in FIG. 1, these links are located in the drop down menu under the "Favorites" button link on the tool bar. Prominently displayed and easily available button links to both the ISP's site 30 and the retailer's shopping sites 32 are also present on the home page 18 (e.g., in the "My Shortcuts" button link collection in the illustrated embodiment). Although not shown, the subscriber's calendar (e.g., "My Calendar") can be pre-populated to highlight events related to the retailer.

The illustrated embodiment of the home page also includes a "Just for You: [retailer's] Favorite Site" statement 34 at a prominent location. This statement can be provided for a limited period of time such as 60 days following the first day of a customer's new subscription, and includes a link to the on-line periodical. The content in the on-line periodical can be supported by the ISP.

Figure 2:
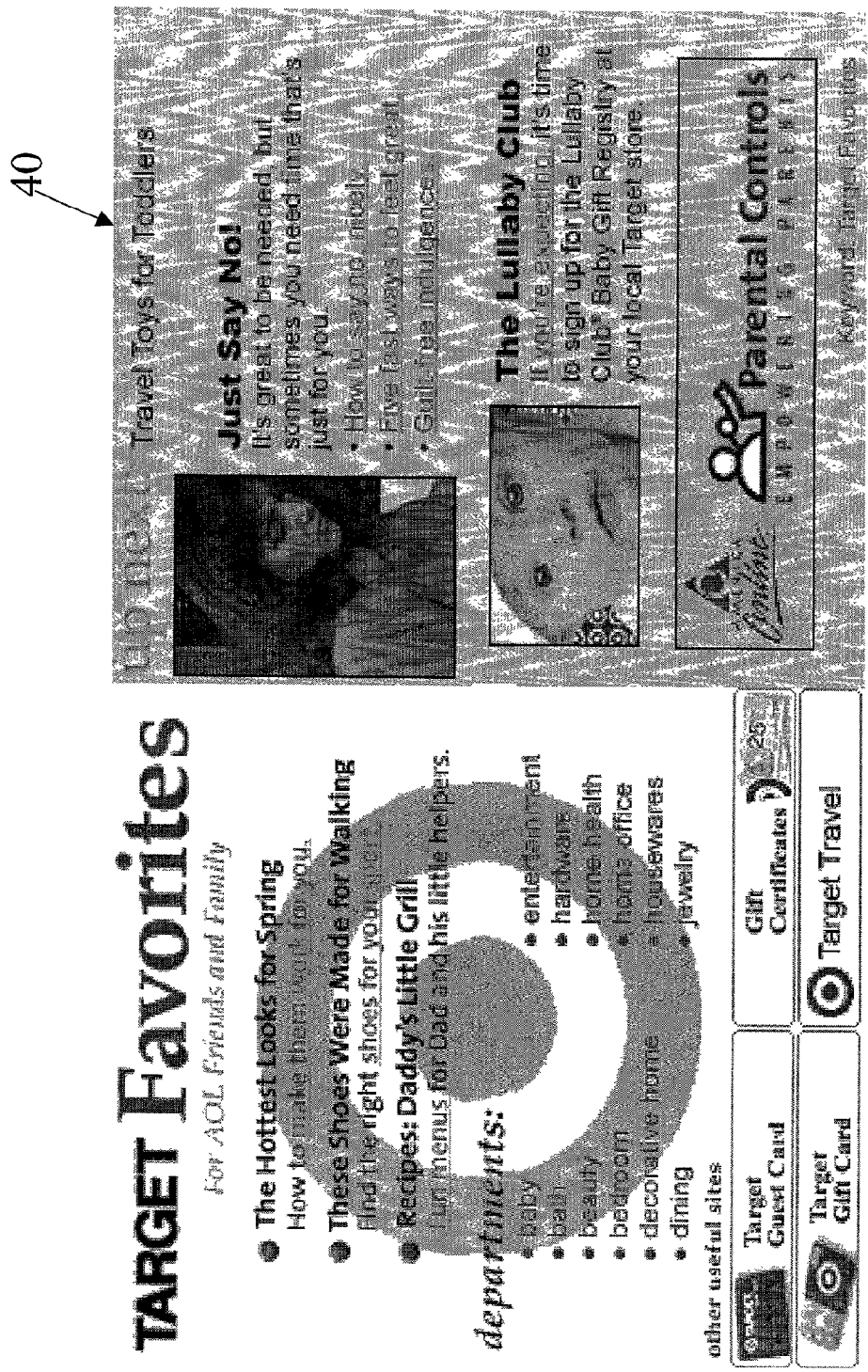
FIG. 2 is an illustration of an example of a co-branded cover page of an on-line periodical that can be accessed from the co-branded Internet site.

FIG. 2 is an illustration of an example of the cover page of a co-branded on-line periodical 40 that can be accessed from links in the co-branded Internet site. As shown, the on-line periodical cover page effectively includes an index with links to articles and other services of interest to subscribers, such as on-line shopping services. Various interactive electronic shopping systems and methods are disclosed in U.S. Pat. No. 6,052,710 (Saliba et al.); U.S. Pat. No 6,032,130 (Alloul et al.); U.S. Pat. No 6,029,141 (Bezos et al.); U.S. Pat. No 6,026,376 (Kenney); U.S. Pat. No 5,956,709 (Xue); U.S. Pat. No 5,956,483 (Grate et al.); U.S. Pat. No 5,715,314 (Payne et al.) and U.S. Pat. No 5,637,847 (Watanabe).

Figure 3:
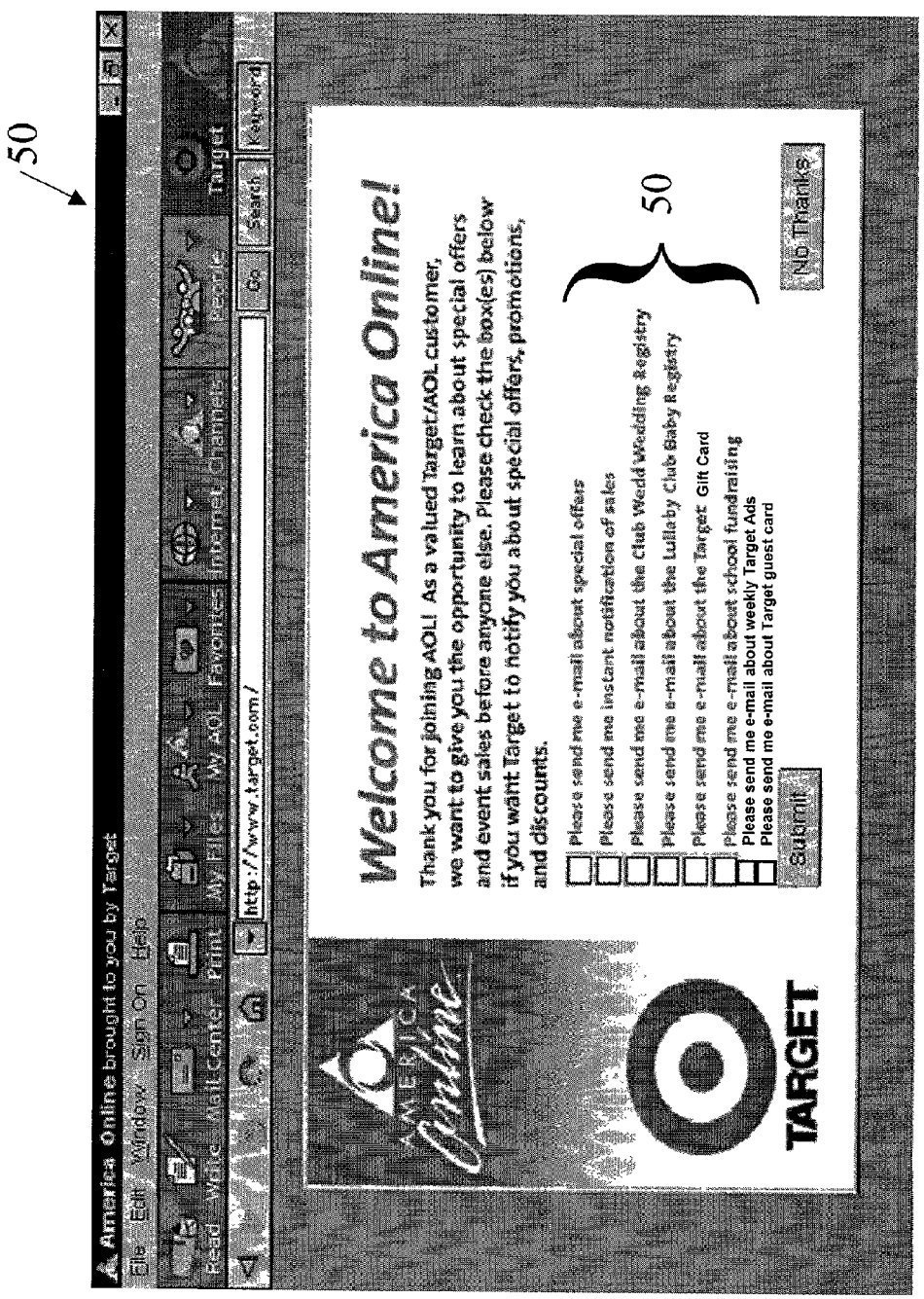
FIG. 3 is an illustration of an example of a co-branded opt-in pop-up page that can be accessed from the co-branded Internet site.

FIG. 3 is an illustration of an example of a co-branded opt-in pop-up page 50 that can be presented to the subscriber during the initial sign-up process. As shown, the page provides the subscriber with the opportunity to express their desire to receive notice 52 of special offers, promotions and discounts such as the retailer's periodic circular and credit card. The retailer can become a "premier" merchant on the shopping suggestion pages of the ISP's premium site (e.g., on the "Shop @" pages on the AOL service site). As the premier merchant, the retailer will have its trademarks and other information presented in a manner which is considered to be the best by the ISP (e.g., in positions sometimes referred to as the "Anchor/Gold" positions).

Figure 4:
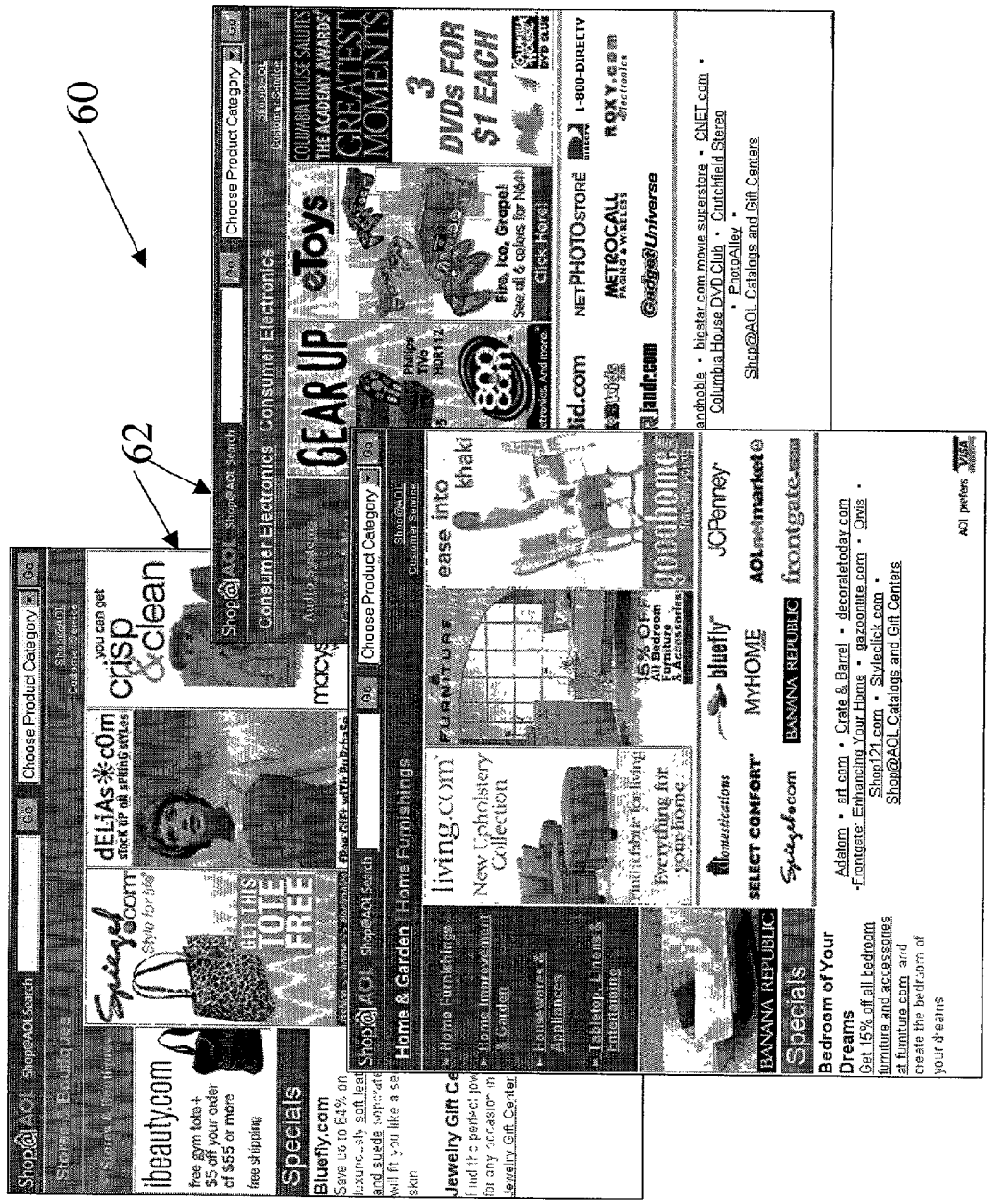
FIG. 4 is an illustration of examples of ISP shopping destination pages with premier merchant locations that can be provided to the retailer in accordance with the present invention.

In one embodiment, the retailer is the premier merchant on shopping suggestion pages referred to as "destinations." Examples include Department Stores, Home Design/Décor, Toys, Apparel, Baby/Kids and Consumer Electronics. FIG. 4 is an illustration of shopping destination suggestion pages 60 with premier locations 62 that can be offered to the retailer in accordance with the invention.

The retailer can be the premier merchant for the search function offered on the ISP's premium site relating to shopping suggestion pages. In connection with this relationship, the retailer can be provided the highest level of product integration against key search terms offered by on the ISP's premium site. Alternatively, a limited number of other retailers could be offered the same level of integration as the retailer with the co-branded site. The retailer with the co-branded Internet site can be provided priority placement in the search results for searches performed on the ISP's premium site.

Figure 5:
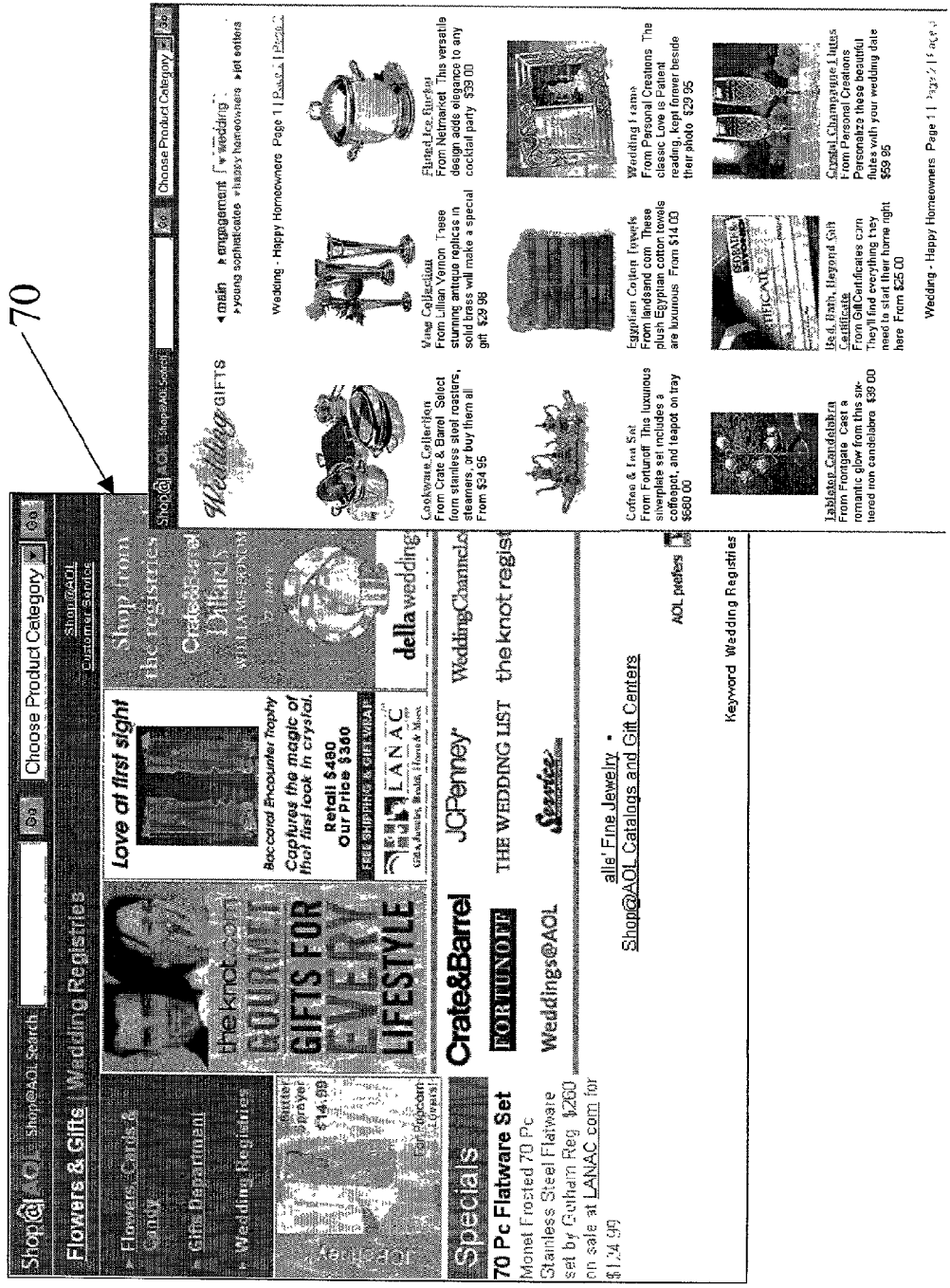
FIG. 5 is an illustration of examples of ISP shopping registry suggestion pages with premier merchant locations that can be provided to the retailer in accordance with the present invention.

The retailer can be the premier and most prominent merchant on registry property offered on the ISP's premium site (e.g., at locations sometimes referred to as "anchor" level placements). FIG. 5 is an illustration of example ISP's premium site registry pages 70 with premier locations 72, 74 that can be offered to the retailer with the co-branded site. The retailer can be prominently featured in merchandise catalogs offered on the ISP's premium site (e.g., in every catalog produced by the merchant). In connection with this activity, the retailer can sponsor periodic seasonal or theme catalogs such as Holiday, Harvest/Halloween, Bridal, and Back-to-School/Back-to-College.

Promotions offered by the retailer can also be prominently featured on a newsletter offered on the ISP's premium site. These promotions can be "clickable" to the point of sale. This feature can be offered to only a limited number of the ISP's partners, preferably to other ISP partners that are not direct competitors of the retailer.

In connection with the co-branded service site, the retailer can provide in its physical stores an "on-line" shop that promotes the ISP's services and the co-branded Internet site. Promotions to other on-line goods and service provide can also be featured in the on-line shop.

All of the patents and patent applications disclosed herein, including those set forth in the Background of the Invention, are hereby incorporated by reference. With regard to the foregoing description, it is to be understood that changes may be made in detail, especially in matters of the construction materials employed and the shape, size and arrangement of the components without departing from the scope of the present invention. It is intended that the specification and depicted aspects be considered exemplary only, with a true scope and spirit of the invention being indicated by the broad meaning of the following claims.

We claim:

1. A method for a retailer of the type having an Internet shopping site to sell merchandise over the Internet, the method comprising:
   providing members access to the Internet shopping site of the retailer; and
   providing members with electronic calendar entries for members' personalized electronic calendars, the calendar entries being related to retailer events;
   wherein the retailer events are incentives to access and shop on the Internet shopping site of the retailer through a co-branded Internet site, and the incentives comprise store-based clearances, promotional events and/or special events provided before publishing notices for such special events to non-members.

2. The method of claim 1, wherein the electronic calendar entries are pre-populated into the members' personalized electronic calendars.

3. The method of claim 2, further comprising providing the members with the personalized electronic calendars.

4. The method of claim 3, wherein the personalized electronic calendars are provided through the co-branded Internet site.

5. The method of claim 1, wherein the incentives include retailer promtions.

6. The method of claim 1, wherein the incentives include sales.

7. The method of claim 1, wherein the retailer events include at least one of a Holiday, Harvest/Halloween, Bridal, and Back-to-School/Back-to-College event.

8. The method of claim 1, wherein the retailer sells merchandise over the Internet in affiliation with an Internet service provider of the type having an Internet service site with a graphical user interface by providing the co-branded Internet site including, the graphical user interface, where the co-branded Internet site is accessed through the Internet service site and includes one or more links to the Internet shopping site of the retailer.

9. The method of claim 8, further comprising providing members incentives by discounting merchandise purchased on the Internet shopping site accessed through the co-branded Internet site.

10. The method of claim 8, further comprising distributing software for the co-branded Internet site at retail stores of the retailer.

11. The method of claim 8, further comprising distributing software for the co-branded Internet site on the Internet shopping site.

12. The method of claim 8, further comprising distributing software fir the co-branded Internet site on the Internet service site of the Internet service provider.

13. A method for a retailer having an Internet shopping site to sell merchandise over the Internet, the method being performed by at least one web server, the method comprising:
   establishing a co-branded Internet site on the at least one web server, wherein the co-branded Internet site is accessible by members through an Internet service site of an Internet service provider, the co-branded Internet site comprises designations of both the retailer and the Internet service provider, the co-branded Internet site includes one or more links to the Internet shopping site of the retailer;

providing members access to the Internet shopping site of the retailer; and providing members with electronic calendar entries for members' personalized electronic calendars, the calendar entries being related to retailer events, wherein providing members with the electronic calendar entries includes pre-populating the members' personalized electronic calendars to highlight events related to the retailer;

wherein establishing the co-branded Internet site includes linking the co-branded Internet site with the Internet shopping site of the retailer to effectuate incentives to access and shop on the Internet shopping site of the retailer through the co-branded Internet site by creating on the co-branded Internet site a hyperlink to an article related to planning a social event and a hyperlink to a page on the Internet shopping site of the retailer offering for sale a product related to the social event.

14. The method of claim 13, wherein the article is provided through a channel link to ISP channel page content of interest to one or more demographic groups of members.

15. The method of claim 13, wherein the social event is a wedding.

16. The method of claim 13, wherein the article includes instructions for using the product.

17. A method for a retailer having an Internet shopping site to sell merchandise over the Internet, the method being performed by at least one web server, the method comprising:

establishing a co-branded Internet site on the at least one web server, wherein the co-branded Internet site is accessible by members through an Internet service site of an Internet service provider, the co-branded Internet site comprises designations of both the retailer and the Internet service provider, and the co-branded Internet site includes one or more links to the Internet shopping site of the retailer;

providing members access to the Internet shopping site of the retailer; and providing members with electronic calendar entries for members' personalized electronic calendars, the calendar entries being related to retailer events, wherein providing members with the electronic calendar entries includes pre-populating the members' personalized electronic calendars to highlight events related to the retailer;

wherein establishing the co-branded Internet site includes linking the co-branded Internet site with the Internet shopping site of the retailer to effectuate incentives to access and shop on the Internet shopping site of the retailer through the co-branded Internet site by creating on the co-branded Internet site a hyperlink to a news article and a hyperlink to a page on the Internet shopping site of the retailer offering for sale a product featured in the news article.

\* \* \* \* \*